United States Patent
Chaiken et al.

(10) Patent No.: US 11,023,602 B2
(45) Date of Patent: Jun. 1, 2021

(54) PREVENTING DIGITAL FORGERY

(71) Applicant: EMC IP Holding Company LLC, Hopkinton, MA (US)

(72) Inventors: Craig L Chaiken, Pflugerville, TX (US); Richard M Tonry, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 270 days.

(21) Appl. No.: 16/393,756

(22) Filed: Apr. 24, 2019

(65) Prior Publication Data
US 2020/0342129 A1 Oct. 29, 2020

(51) Int. Cl.
| | |
|---|---|
| G06F 21/62 | (2013.01) |
| G06F 21/44 | (2013.01) |
| G06F 21/60 | (2013.01) |
| H04L 9/08 | (2006.01) |
| H04L 9/32 | (2006.01) |

(52) U.S. Cl.
CPC .......... G06F 21/6209 (2013.01); G06F 21/44 (2013.01); G06F 21/602 (2013.01); H04L 9/0825 (2013.01); H04L 9/0872 (2013.01); H04L 9/3247 (2013.01); H04L 9/3297 (2013.01); G06F 2221/0708 (2013.01); G06F 2221/2151 (2013.01)

(58) Field of Classification Search
CPC .... G06F 21/6209; G06F 21/44; G06F 21/602; G06F 2221/0708; G06F 2221/2151; H04L 9/0872; H04L 9/3297; H04L 9/0825; H04L 9/3247
See application file for complete search history.

(56) References Cited

U.S. PATENT DOCUMENTS

| | | | | |
|---|---|---|---|---|
| 2002/0001395 A1* | 1/2002 | Davis | ....... | G06F 21/10 |
| | | | | 382/100 |
| 2002/0056042 A1* | 5/2002 | van der Kaay | ..... | H04L 63/0823 |
| | | | | 713/178 |
| 2004/0054906 A1* | 3/2004 | Carro | ....... | G06F 21/64 |
| | | | | 713/171 |
| 2006/0128398 A1* | 6/2006 | Chin | ....... | H04M 3/38 |
| | | | | 455/456.3 |
| 2009/0083372 A1* | 3/2009 | Teppler | ....... | H04L 9/3226 |
| | | | | 709/203 |

(Continued)

Primary Examiner — Matthew Smithers
(74) Attorney, Agent, or Firm — Staniford Tomita LLP

(57) ABSTRACT

An indication is received to export a file from a host having an authentication device. A memory buffer is allocated for a signature region, a header region, and a content region. A location stamp and a time stamp are calculated for content of the file. The location and time stamps are copied to the header region. An authentication signature is generated using a private key associated with the authentication device. The authentication signature is based on the header and content regions, which include the copied location stamp and timestamp, and content of the file. The authentication signature is copied to the signature region. The memory buffer is written to a new file, the new file being a signed version of the file and including the signature region having the authentication signature, the header region having the location and time stamps, and the content region having the content of the file.

20 Claims, 13 Drawing Sheets

(56) References Cited

U.S. PATENT DOCUMENTS

| | | | |
|---|---|---|---|
| 2009/0136159 A1* | 5/2009 | Guan | H04N 1/32144 |
| | | | 382/311 |
| 2011/0087887 A1* | 4/2011 | Luft | H04L 9/3247 |
| | | | 713/178 |
| 2015/0302216 A1* | 10/2015 | Kurian | G06F 21/6209 |
| | | | 726/28 |
| 2018/0026790 A1* | 1/2018 | Seo | H04L 9/14 |
| | | | 713/181 |
| 2018/0048945 A1* | 2/2018 | Al Mohizea | H04N 1/00244 |
| 2018/0349567 A1* | 12/2018 | Kim | G06Q 10/10 |

\* cited by examiner

Security Template 670

| | | | |
|---|---|---|---|
| Template Name | Template A | | |
| Time Stamp Authentication | Enabled ▽ | | |
| Location Stamp Authentication | Enabled ▽ | | |
| Exclusion Zones | Disabled ▽ | N/A | |
| Geo-fence | Enabled ▽ | Corporate Campus | |
| Time-fence | Enabled ▽ | Weekdays; 9AM to 5PM | |
| Expiration Date | Disabled ▽ | N/A | |
| Device ID Limiting | Disabled ▽ | N/A | |

[Save] [Cancel]

FIG. 6B

PREVENTING DIGITAL FORGERY

TECHNICAL FIELD

The present invention relates generally to information processing systems, and more particularly, to systems and techniques for security and authentication.

BACKGROUND

Digital forgery refers to the modification of file contents, file attributes, properties, or file metadata. Digital forgery is a major problem in the modern world. For example, by changing the time and date of a file, the file can serve as false evidence that an event occurred at a time that is different from the actual time that the event occurred. A photo could falsely implicate a suspect or falsely provide an alibi. A business could claim a document was created earlier than it had been. There is a need for digital attestation of a document's authenticity to prevent such scenarios. It is currently difficult to validate a file source—such as where and when a file was created. This challenge spans the industry from corporate security, law enforcement and government intelligence agencies. It is also challenging to control when and where a file is accessed, so if an unauthorized user were to copy the file and know the password, they may access the file at will.

There is a need for improved systems and techniques for authenticating and securing files.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 6B shows an example of a security template that may be applied to a file upon export, according to one or more embodiments.

DETAILED DESCRIPTION

Figure 1:
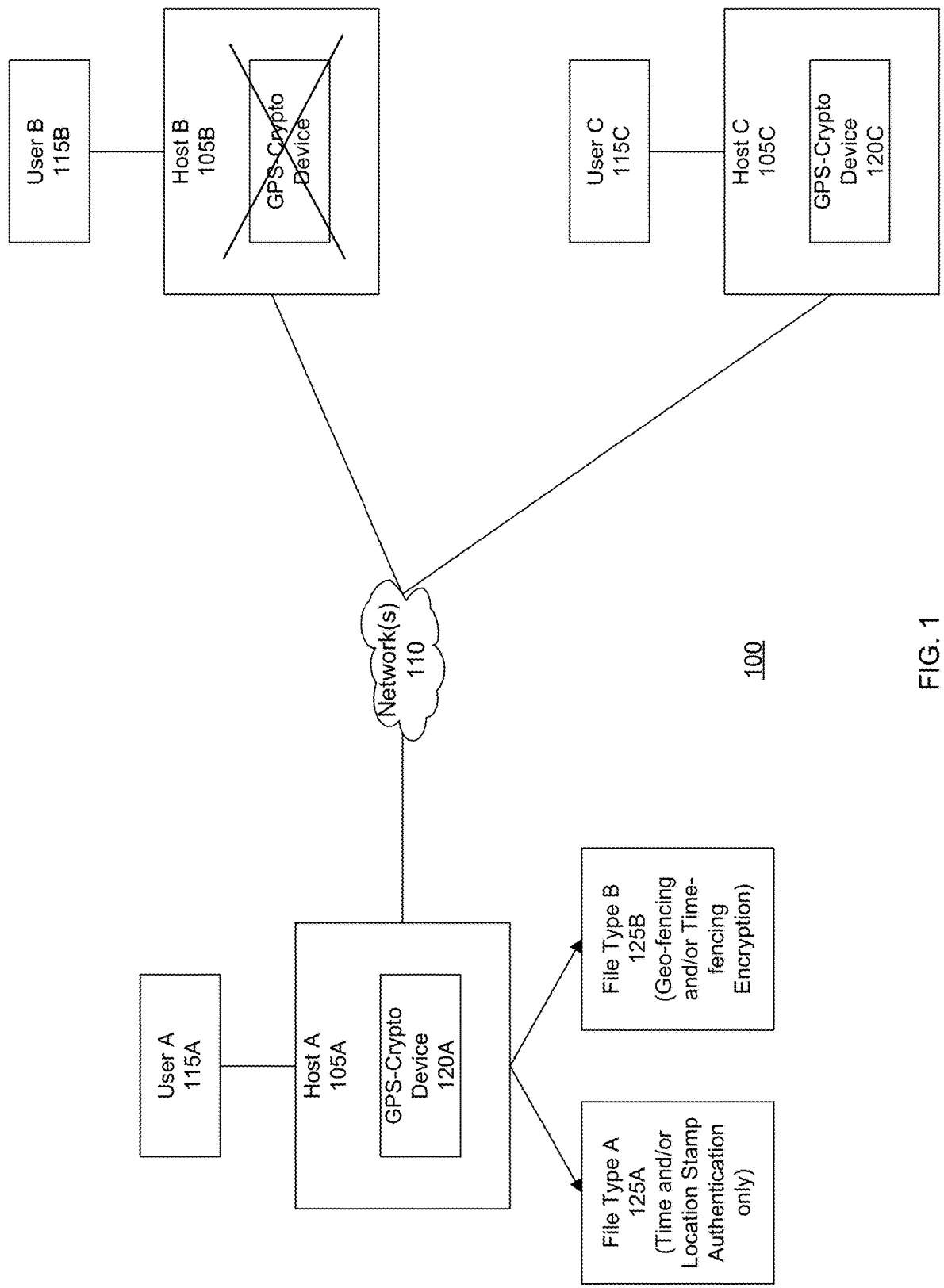
FIG. 1 shows a block diagram of an information processing system for reducing digital forgery, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for stopping, preventing, or reducing digital forgery and controlling file access. More specifically, techniques are provided to help guarantee that the time and date indicating when a file was created is, in fact, the actual time and date that the file was created. Techniques are further provided to control when and where a file can be accessed.

FIG. 1 shows a simplified block diagram of an information processing system 100 configured in accordance with an illustrative embodiment. The information processing system includes any number of hosts, such as hosts 105A-C, which communicate with each other over a network 110.

Network 110 is assumed to comprise a portion of a global computer network such as the Internet, although other types of networks can be part of network 110, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

In an embodiment, a host is an electronic computing device or computer that may include a central processing unit (CPU), memory (e.g., random access memory (RAM) or read-only memory (ROM)), non-volatile storage, network interface, and operating system. Some specific examples of computing devices include workstations, servers, desktops, laptops, tablet computers, mobile telephones, smartphones, portable communication devices, or other types of processing devices.

Users, such as users 115A-C, can use the hosts to execute or run any number of application programs. Some examples of application programs include document processing programs such as Microsoft Word, spreadsheet programs such as Microsoft Excel, presentation programs such as Microsoft PowerPoint, photo editing programs such as Adobe Photoshop, video editing programs such as Adobe Premiere and Apple iMovie, and many others. Typically, these programs store data and other information to an object referred to as a file. The file may be transmitted over the network and accessed, if appropriate, by other users.

In a specific embodiment, a host, e.g., host 105A, includes a GPS-Crypto device or module, e.g., GPS-Crypto device 120A. The GPS-Crypto device may be referred to as an authentication device or authentication module. In a specific embodiment, the GPS-Crypto device is a chip or hardware module that has a global positioning system (GPS) device and cryptography or crypto engine in a single device, chip package, or housing (heretofore referred to as GPS-Crypto). In this specific embodiment, the GPS component provides authenticated time and location information and the crypto engine component uses that GPS data to timestamp and location stamp data and to salt the authentication signature of the data. It is desirable that the GPS and crypto components share the same package to prevent GPS data from being spoofed. The GPS-Crypto device contains a unique identifier (ID) that can be used to identify which GPS-Crypto device signed/encrypted the file, and can be used to validate that this particular GPS-Crypto device is authorized to decrypt the file.

In a specific embodiment, the GPS-Crypto device supports two types of files. A first file type or file class 125A allows for time stamp authentication, location stamp authentication, or both. There is a private key fused into the device and is protected by Federal Information Processing Standard (FIPS) 140-3/4 protections. A public key is used to confirm that the contents were generated at the time and place indicated by the GPS data in the file header.

In this specific embodiment, it is not necessary for a recipient computer to have the GPS-Crypto device in order to access the file and verify that GPS data, including the file source location and file creation time stamp recorded in the file header, has not been tampered with. For example, a user 115B at a computer, e.g., host 105B, that does not include a GPS-Crypto device, as shown by the superimposed "X," is still able to verify whether the GPS data included in the header of the file is authentic or invalid (e.g., has been tampered with). Even though a file may remain unencrypted and be accessible to anybody, a recipient user can at least verify that the file timestamp, location stamp, or both has not been tampered with so long as the recipient computer has the ability to handle public keys. Generally, it is very easy to change metadata of a file such, as its time and date data, especially if there is read/write access. The disclosed systems and techniques allow users to determine whether or not such data has been tampered with.

A second file type or file class 125B allows for geo-fencing encryption, time-fencing encryption, or both. In a specific embodiment, a file can only be read or executed on a computer, e.g., host 105C, with a GPS-Crypto device, and only if the GPS location and time (or other context) meet criteria stored in the file header.

Figure 2:
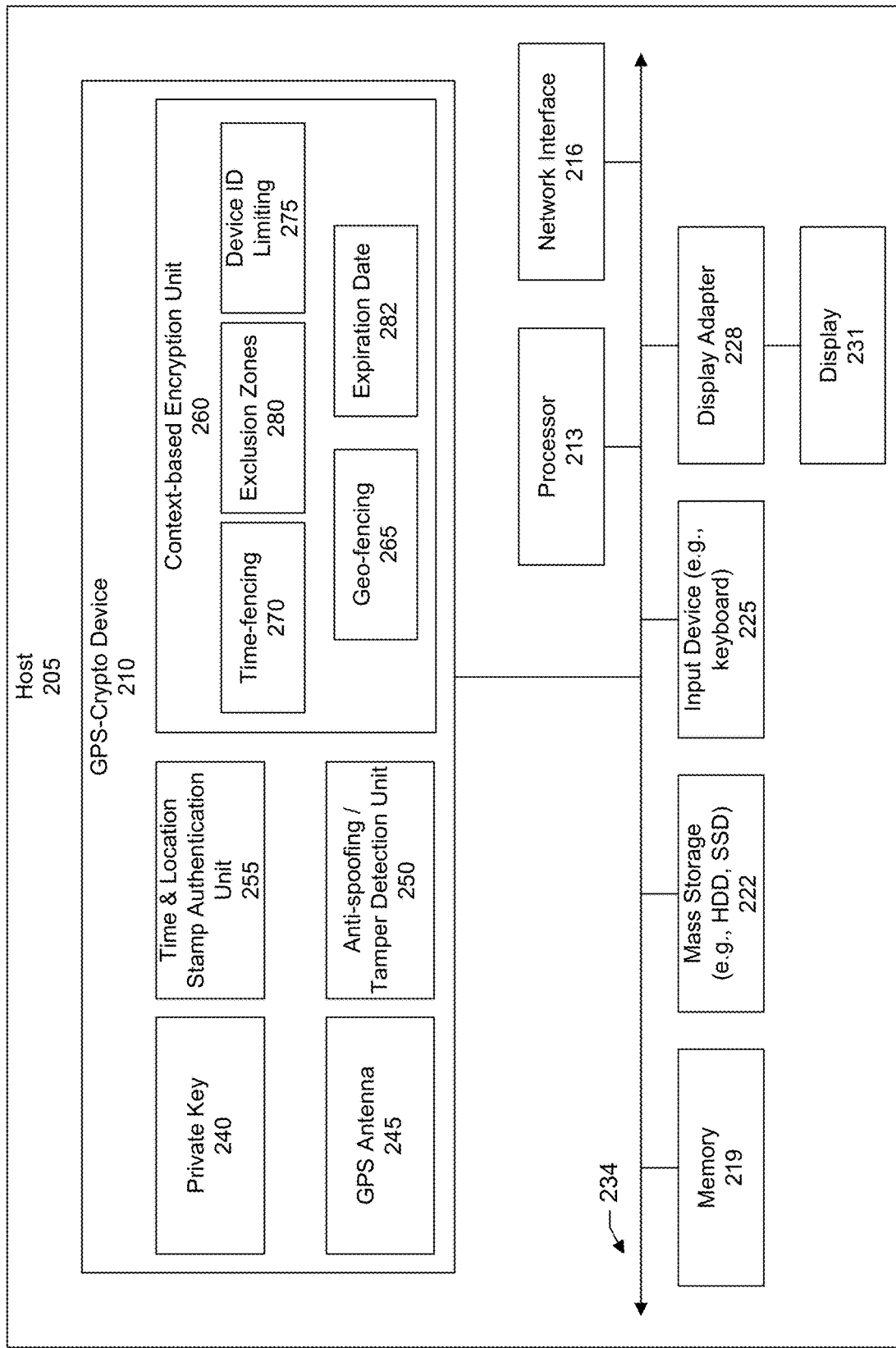
FIG. 2 shows a block diagram of a GPS-Crypto device, according to one or more embodiments.

FIG. 2 shows a block diagram of a host 205 having a GPS-Crypto device 210 in further detail. As discussed, the host may include, in addition to the GPS-Crypto device, components such as a processor 213, network interface 216, memory 219, mass storage 222, input device 225, display adapter 228, and display 231 that are connected by a bus 234. As shown in the example of FIG. 2, the GPS-Crypto device includes several units, components, or sub-modules such as a private key 240, GPS antenna 245, anti-spoofing/tamper detection unit 250, time and location stamp authentication 255, and a context-based encryption unit 260. The context-based encryption unit may include a geo-fencing component 265, time fencing component 270, device identifier (ID) limiting component 275, an exclusion zones component 280, and an expiration date component 282. It should be appreciated that the blocks shown in FIG. 2 can be functional and there can be many different hardware and software configurations to implement the functions described.

The private key includes a key code paired with a corresponding public key and may be burned into a read-only location by a factory that manufactures the GPS-Crypto devices. Public-key cryptography provides for a private key and a corresponding public key. The public key may be shared while the private key may be kept secret. A file can be verified by signing the file with a particular private key and sending the file along with the digital signature to another recipient who can then verify the file and signature using a corresponding public key. In particular, a user can sign a communication with the user's private key and send the communication along with a digital signature to a targeted entity or party, who then verifies the communication and the digital signature with the user's public key.

The GPS antenna is responsible for receiving GPS signals from GPS satellites so that the GPS-Crypto device can determine its current or present geographical location. In some embodiments, the GPS-Crypto device may further integrate or augment GPS signals with signals from other sources such as wireless networks, radio towers, or ground-based or satellite-based augmentation systems in order to make more accurate location determinations.

The anti-spoofing/tamper detection unit is responsible for preventing, blocking, monitoring, mitigating, or recovering from attempts to disable or alter the functions of the GPS-Crypto device. A spoofing attack, for example, is a situation in which a person or program attempts to masquerade as another by falsifying data. More particularly, there can be 3 types of GPS spoofing including 1) software spoofing, 2) open air GPS simulation spoofing, and 3) Faraday cage GPS spooking.

In software spoofing, the software that reads GPS data is intercepted. Then false GPS data is returned as if it came from the GPS. However, since the GPS-Crypto device is a single hardware component, it is not susceptible to that method of GPS spoofing. In open air GPS simulation spoofing, a commercially available GPS simulation device generates fake GPS data with a higher amplitude to all actual GPS signals, but it injects noise of approximately the same amplitude of the real GPS signals, so the real GPS signals will be corrupted. To detect this method of GPS Spoofing the GPS-Crypto device: a) identifies noise with a frequency equal or faster than the real GPS signal; b) identifies noise with an amplitude high enough to interfere with average an GPS signal amplitude; and c) analyzes the noise, looking for a higher amplitude at the GPS signal frequency.

In a Faraday cage GPS spoofing, a GPS simulation device is placed in a Faraday cage which blocks all radio signals. In a specific embodiment, the GPS-Crypto device detects this method of GPS spoofing by transmitting a signal at a random frequency and waits for the signal to bounce back. In a Faraday cage, radio waves will bounce back quickly from multiple directions, but outside of a Faraday cage, radio waves bounce back slower (if at all). In another specific embodiment, the GPS-Crypto device watches for signal echoing of ambient signals, consistent with being in a Faraday cage.

In a specific embodiment, if the GPS-Crypto device detects any method of GPS spoofing, the device disables itself until spoofing is no longer detected. For example, the device may be disabled for 1 minute, 5 minutes, 1 hour, 24 hours, 48 hours, 72 hours, or any length of time as desired. In a specific embodiment, the crypto module meets FIPS 140-2 Level 3 or 4. Tampering detections, such as atypical voltage/power signatures, signal inputs, and/or signal impedance detection changes can also generate a lockout. Instead or additionally, the private key store may be blown or otherwise self-destruct in which encryption keys are erased or rendered unusable.

The time and location stamp authentication unit is responsible for determining a time, location, or both to be associated with a file, recording the information in a header of the file, signing the file with the private key to generate an authentication signature, and adding the authentication signature to the file. The time may include a time and date that the file was created, a time and date that the file was last modified, a time and date that the file was exported, or combinations of these. Likewise, the location may include a location at which the file was created, a location at which the file was last modified, a location at which the file was exported, or combinations of these. The location can be at a particular level of granularity such as a country, state, city, area code, town, neighborhood, zip code, postal address, and latitude and longitude.

The context-based encryption unit is responsible for encrypting the file so that the file can be accessed only under certain contexts. A context can describe a condition under which an encrypted file may be accessed (or not accessed). In a specific embodiment, a context indicates a condition that must be satisfied before an encrypted file can be accessed, e.g., decrypted. Conditions may include location, place, time, date, recipient device identifier, or combinations of these.

More particularly, when desired, the geo-fencing unit can generate a virtual geographic boundary or perimeter that defines an area within which the file is allowed to be accessed. For example, a user may decide that a file is only allowed to be accessed at the corporate campus. Thus, for example, even if the file is copied onto a portable hard drive and transported away from the corporate campus location, a user will not be able to access the file because the file will remain encrypted.

Alternatively, there can be an exclusion zone that defines an area within which the file is not allowed to be accessed. For example, a user may designate a particular building or facility that houses temporary employees or employees who have not passed certain security background checks as being an exclusion zone. In this example, the file will not be able to be accessed from that particular building.

The time fencing unit can generate the times and dates that file access is (or is not) allowed. For example, a user may decide that a file is allowed to be accessed only on the weekdays (e.g., Monday, Tuesday, Wednesday, Thursday, and Friday) and between the hours of 9:00 AM to 5:00 PM. Attempts to access the file outside of these dates and times will be blocked, e.g., file will remain in an encrypted format. For example, an attempt to access the file between 5:01 PM and 8:59 AM will be blocked; or attempts to access the file on Saturday or Sunday will be blocked.

The device ID limiting component is responsible for generating a list of one or more devices that are allowed (or not allowed) to access the file. In particular, each GPS-Crypto device may be identified or associated with a globally unique identifier assigned during manufacture. If desired, the device ID limiting component can be used to identify GPS-Crypto devices via their device ID that are allowed to access a particular file. For example, a user may decide that only GPS-Crypto devices ID-A, ID-B, ID-C, ID-D, and ID-E are allowed to access a particular file. If a GPS-Crypto device having a device ID of ID-K attempts to access the particular file, the access will be blocked (e.g., file will not be decrypted and will remain encrypted).

The expiration date component is responsible for generating a date after which the file will no longer be accessible. For example, the user may decide that a particular file is time-sensitive or useful for only a specific time period. This option allows the user to set an expiration date (or time period) where the file will remain encrypted and thus inaccessible once that date or time period has elapsed.

Figure 3:
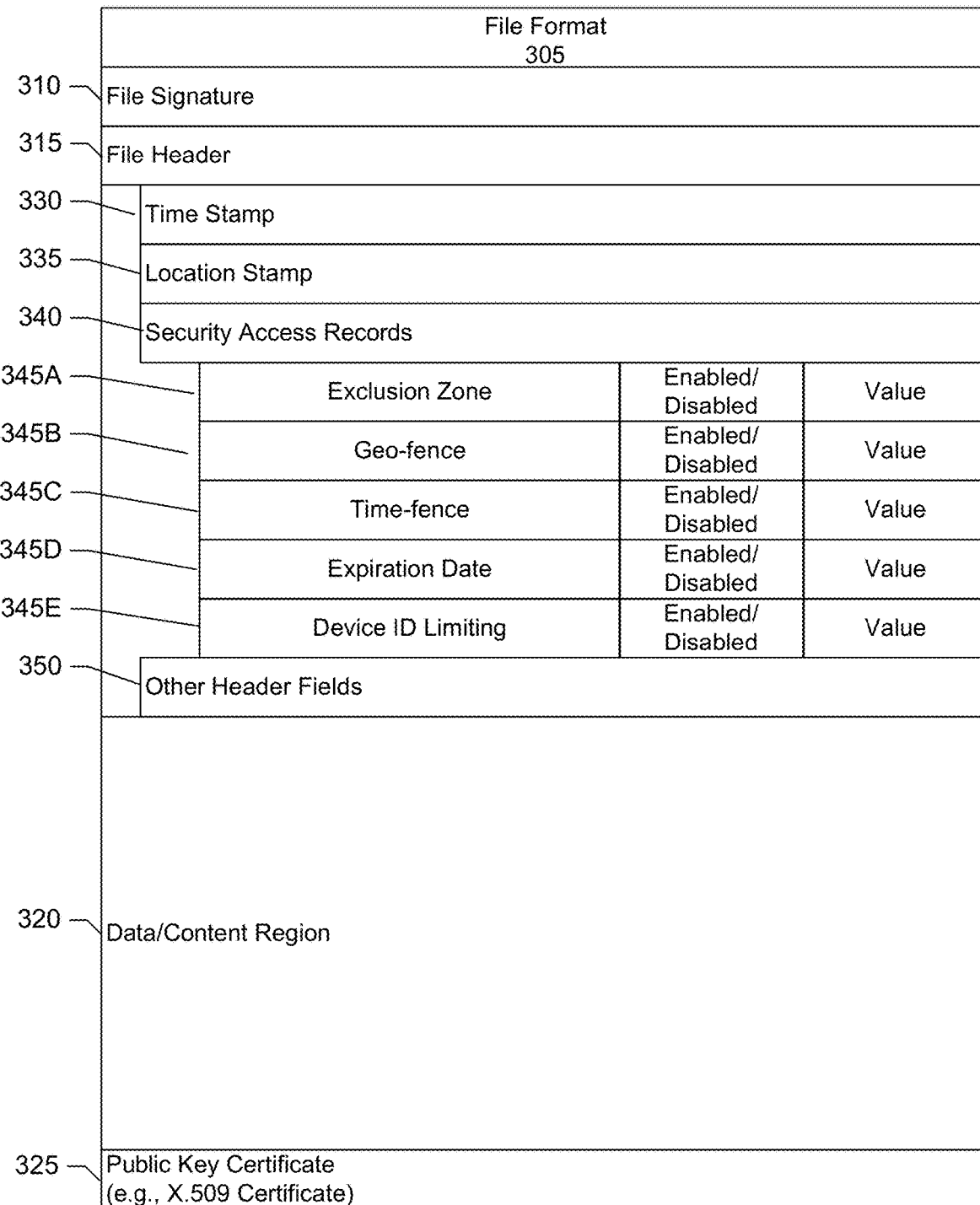
FIG. 3 shows a block diagram of a file format provided by the GPS-Crypto device, according to one or more embodiments.

FIG. 3 shows a block diagram of a GPS-Crypto file format 305 that may be created upon export of a file via the GPS-Crypto device of a host. In a specific embodiment, GPS-Crypto files include three primary regions including a signature region 310, a header region 315, and a data or file content region 320, along with a public key certificate 325. In a specific embodiment, the file signature may be used to authenticate an entire file besides the file signature.

The file header may contain header flags, data region offset and size, GPS data, and security access right records. In particular, the header may include any number of attributes, security flags, security access records, or combinations of these.

In the example shown in FIG. 3, the header includes a field 330 storing a timestamp associated with the file (e.g., time and date file was created, time and date file was last modified, time and date file was exported from the host, or combinations of these) and a field 335 storing a location stamp associated with the file (e.g., geographical location indicating a location of the host where the file was created, geographical location indicating a location of the host where the file was last modified, geographical location indicating a location of the host where the file was exported, or combinations of these).

The header may further include a set of security access records 340. A security access record defines a condition or context under which access to the file content is (or is not) allowed. Each security access record may include a flag indicating whether a particular security access condition is set to enabled or disabled and a corresponding value.

The example shown in FIG. 3 includes security access records 345A-345E. First security access record 345A is an exclusion zone that identifies one or more zones or virtual geographical boundaries where the file is not allowed to be accessed. Second security access record 345B is a geo-fence that identifies one or more virtual geographic boundaries where the file is allowed to be accessed. Third security access record 345C is a time-fence identifying a time, day, or both when the file is allowed to be accessed. Fourth security access record 345D is an expiration date identifying a date after which the file is no longer allowed to be accessed. Fifth security access record 345E is a GPS-Crypto device ID limiting condition identifying one or more GPS-Crypto device IDs that are allowed (or not allowed) to access the file. There can be other header fields or metadata 350 (e.g., offset, file length, size, company name, version, and the like); or combinations of these. The file header may include a whitelist that identifies one or more locations, times, dates, recipients, or combinations of these where access to the file is allowed. Instead or additionally, the file header may include a blacklist that identifies one or more locations, times, dates, recipients, or combinations of these where access to the file is not allowed.

The data region stores the actual file content which may be either unencrypted raw data (as in the case of a first file type) or data encrypted with the GPS-Crypto private key (as in the case of a second file type).

Certificate 325 may be appended or added to the file after the data/content region. In a specific embodiment, the certificate satisfies the public key X.509 certificate standard or format.

Figure 4:
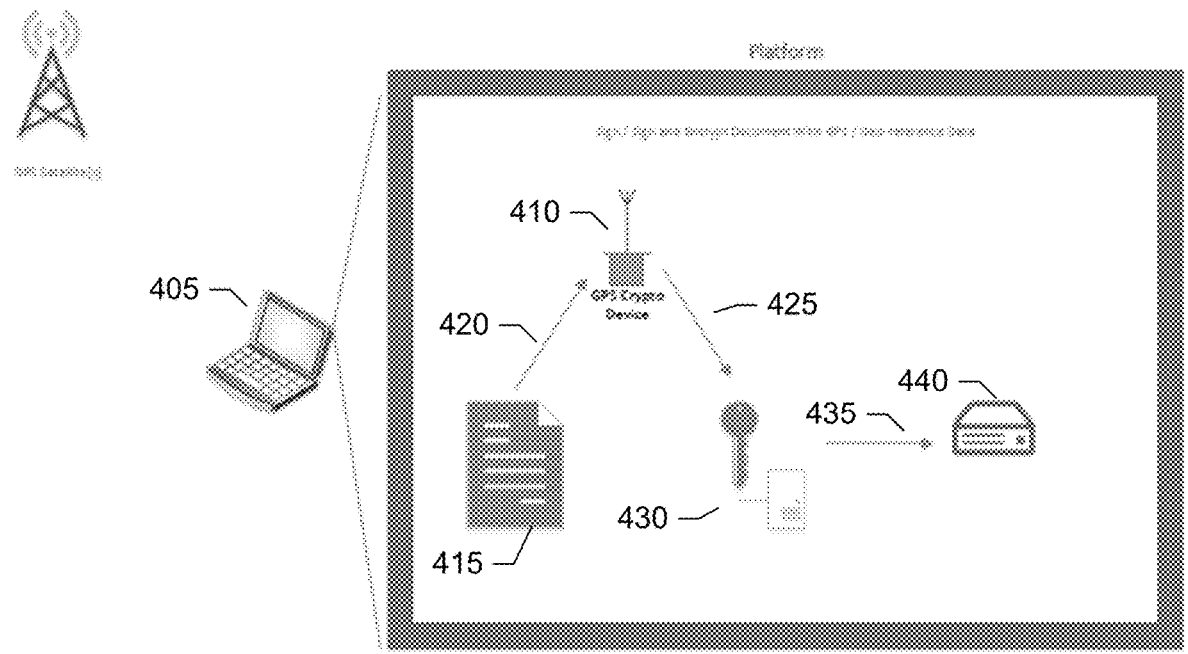
FIG. 4 shows an example of signing, or signing and encrypting a document, according to one or more embodiments.

FIG. 4 shows a block diagram of a host platform 405 having a GPS-Crypto device 410 in which a document or file 415 may be signed and, optionally, encrypted such as with GPS/geo-reference data. As shown in the example of FIG. 4, the document is piped 420 through the GPS-Crypto device of the host to export or create 425 a secured version 430 of the document which is then written 435 to a hard disk 440.

Figure 5:
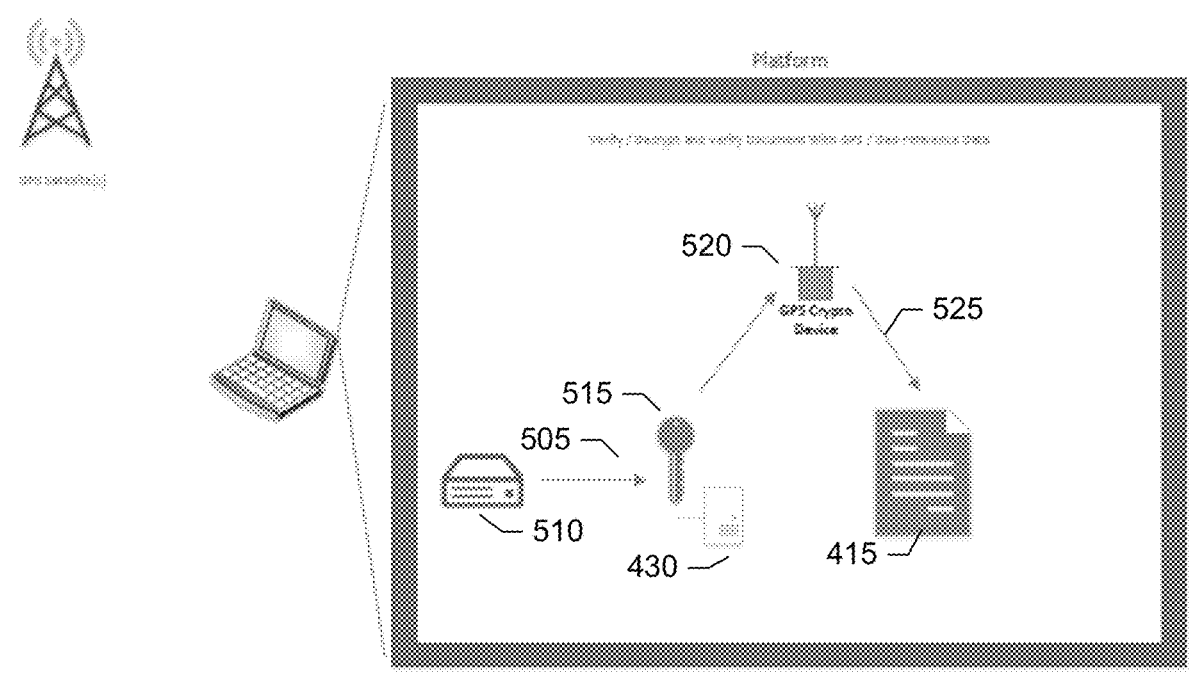
FIG. 5 shows an example of verifying, or verifying and decrypting the document, according to one or more embodiments.

FIG. 5 shows a block diagram for accessing the secured version of the document. As shown in the example of FIG. 5, secured version 430 of the document is retrieved 505 from a hard drive 510. A public key 515, corresponding to a private key used to sign the document, is received or obtained by GPS-Crypto device 520 and, subject to any security context conditions being satisfied, GPS-Crypto device 520 decrypts 525 the document so that the document is readable.

Figure 6A:
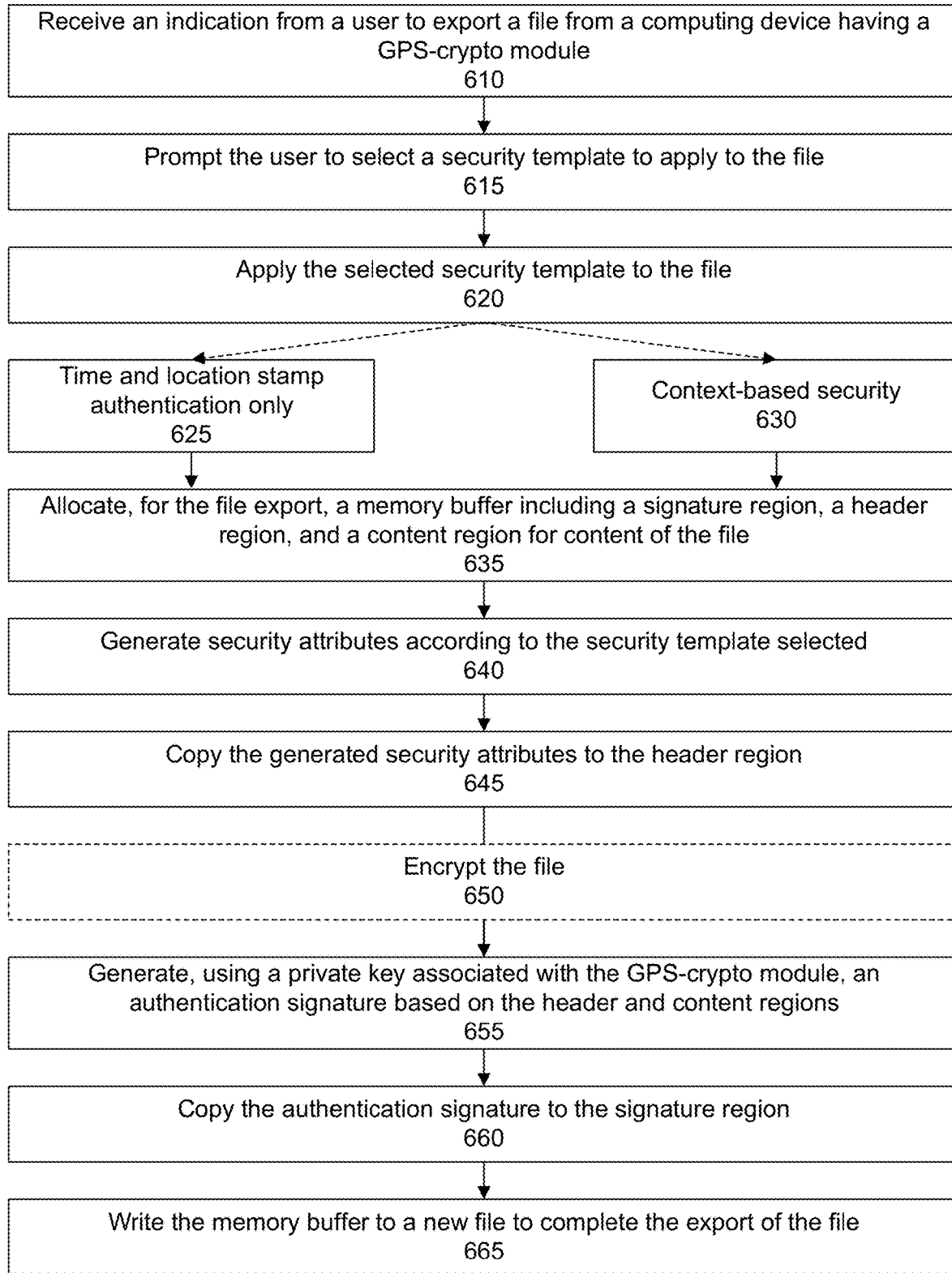
FIG. 6A shows an overall flow to sign, or sign and encrypt a file, according to one or more embodiments.

FIG. 6A shows an overall flow of exporting a file from a host via the GPS-Crypto device of the host. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 610, an indication is received from a user to export a file from a host having a GPS-Crypto device. In a specific embodiment, the GPS-Crypto device may include a plug-in to an application program, such as a Microsoft Word, Microsoft PowerPoint, Microsoft Excel, or others. In this specific embodiment, the plug-in provides the application program with a menu option for exporting the file. For example, when an author, creator, or other user of the file is ready to publish the file, the user can select the export option from within the application program used to create and edit the file. The plug-in helps to provide the user with a seamless user experience as exporting the file via the GPS-Crypto device can be performed within a GUI that the user is familiar with.

In another specific embodiment, the export functionality may instead or additionally be provided as a stand-alone application program of the GPS-Crypto device that is separate from the application program initially used to create and edit the file. For example, the GPS-Crypto stand-alone program may execute on the host independent of the application program executing on the host. When the user is ready to export the file, the user can launch the stand-alone application program (e.g., double click application icon) and browse and select the file to be exported.

In a step 615, the user is prompted to select a type of security template to apply to the file to be exported. In a specific embodiment, the GPS-Crypto device provides for the creation and maintenance of a set of security templates. A template may include pre-defined security access records and attributes for various contextual security conditions such as an exclusion zone, geo-fence, time-fence, expiration date, recipient GPS-Crypto device IDs, or combinations of these.

For example, there can be a first template named "top secret" that enables first, second, and third security access records while disabling other security access records. The first security access record may define a first geo-fence that allows access to the file only when on the corporate campus. The second security access record may define a first time-fence that allows access to the file only during the weekdays and between the hours of 9:00 AM and 5:00 PM. The third security access record may define an expiration date of one week or a particular date after which the file will no longer be accessible.

There can be a second template named "secret" and that enables fourth and fifth security access records while disabling other security access records. The fourth security access record may define a second geo-fence, different from the first geo-fence, that allows access to the file only when in a particular country (e.g., U.S.A.) The fifth security access record may define a second time-fence, different from the first time-fence, that allows access to the file at any time during the weekdays. The second template may not include an expiration date.

There can be a third security template named "unrestricted" that provides time and location stamp authentication only.

The security templates may be created at a central management server location by an information technology (IT) department of the organization and distributed to each of the various hosts having a GPS-Crypto device. The templates can help to enforce uniform security standards across the organization and facilitate the file export process. For example, during a file export, the user at a particular host having the GPS-Crypto device will not have to proceed through a potentially lengthy process of defining or redefining exclusion zones, geo-fences, time-fences, and expiration dates. Rather, the user can merely identify the file to be exported and select an appropriate security template. The security template includes pre-defined flag settings and corresponding values (e.g., time stamp authentication, location stamp authentication, exclusion zones, geo-fences, time-fences, and expiration dates) that are applied to the file at export.

FIG. 6B shows an example of a security template 670 that the IT department has named "template A." The security template includes flag settings that have a dropdown menu to allow the user to toggle between enabling and disabling a security option or flag. In the example of the security template shown in FIG. 6B, the time stamp authentication flag setting and location stamp authentication flag setting has been enabled. The exclusion zones flag setting has been disabled. Geo-fence flag setting has been enabled and the corresponding condition for the geo-fence has a value of "corporate campus." This means that the exported file may be accessed only from the corporate campus. The time-fence flag setting has been enabled and the corresponding condition has a value of "weekdays, 9:00 AM to 5:00 PM." This means that the exported file may be accessed only during the weekdays and between the hours of 9:00 AM and 5:00 PM. The expiration date flag setting has been disabled. The recipient device ID limiting flag setting has been disabled.

Instead or additionally, the file export program (e.g., plug-in or stand-alone program) can include an option for the user to manually define security access records including corresponding contexts during the file export process. This allows the user to define custom security access records. The manual option may include a wizard that steps the user through the process of creating security access records.

Referring back now to FIG. 6A, in a step 620, the GPS-Crypto device applies the selected security template to the file. As discussed, a file may have time and location stamp authentication only (step 625). While this type of file may be accessible to anybody because it is not encrypted, a recipient user can still verify whether or not the time and location stamp associated with the file has been tampered with. Further, the verification can be performed on a host that does not have the GPS-Crypto device.

Alternatively, a file may have one or more context-based security conditions in which file access is permitted only when certain conditions have been satisfied (step 630).

In other words, based on the flag settings of the selected security template, the security access records and corresponding values are copied from the security template and into the file header region of the file upon export.

In a step 635, the GPS-Crypto device allocates, for the file export, a memory buffer including a signature region, a header region, and a content region. In a step 640, the GPS-Crypto device generates security attributes according to the security template selected. For example, there can be time and location stamp authentication only in which only a time and location stamp may be generated. Alternatively, in addition to the time and location stamp, a geo-fence may be generated, a time-fence may be generated, an exclusion zone may be generated, or combinations of these.

In a step 645, the generated security attributes are copied to the header region allocated in the memory buffer. For example, in various specific embodiments, a time and location stamp may be generated indicating a current time and location of the file export. The time and location stamp may be copied to the header region. Instead or additionally, a geo-fence defining a virtual geographic boundary in which the file is allowed to be accessed may be generated. The geo-fence may be copied to the header region. Instead or additionally, a time-fence defining times and dates within which the file is allowed to be accessed may be generated. The time-fence may be copied to the header region. Instead or additionally, an exclusion zone defining a virtual geographic boundary in which the file is not allowed to be accessed may be generated. The exclusion zone may be copied to the header region. Instead or additionally, an expiration date indicating a time and date after which (or once elapsed) the file will not be accessible may be generated. The expiration date may be copied to the header region. Instead or additionally, a listing of one or more GPS-Crypto device IDs identifying devices allowed to access the file may be generated. The listing of GPS-Crypto device IDs may be copied to the header region.

In a step 650, the file is encrypted. Block 650 is shown using broken lines to indicate that the encryption step is optional. For example, a file may remain in an unencrypted format if the selection was for time and location stamp authentication only.

In a step 655, the GPS-Crypto device generates, using a private key associated with the GPS-Crypto device, an authentication signature based on the header (including the generated security attributes that were copied) and content regions. In other words, the authentication signature may be generated after attributes such as the current time and location of the file export (or time and location of file creation, time and location of last modification, or combinations of these), geo-fence, time-fence, exclusion zone, listing of authorized GPS-Crypto device IDs, expiration date, or combinations of these have been copied to the header region.

In a step 660, the GPS-Crypto device copies the authentication signature to the signature region allocated in the memory buffer.

In a step 665, the GPS-Crypto device writes the memory buffer (having the populated signature, header, and content regions) to a new file and appends the corresponding public key or certificate to the file to complete the export of the file. The new file may be referred to as an exported version of the file, a secured version of the file, or a signed version of the file.

The public key may be used to confirm that data in the file header (e.g., time stamp, location stamp, or both) has not been tampered with. Specifically, the file header may include information indicating where the file was created, when the file was created, or both. If the information in the file header is tampered with, the public key will not be usable to decrypt the file (if encrypted) or—in the case of an unencrypted file—the recipient user will know that data in the file header has been tampered with. For example, the public key may be used to calculate a signature for the file. A calculated signature that does not match the signature in the file can indicate that the file has been tampered with (e.g., timestamp in file header tampered with, or location stamp in file header tampered with). A calculated signature that does match the signature in the file can indicate the file has not been tampered with (e.g., timestamp in file header has not been tampered with, or location stamp in file header has not been tampered with).

In a specific embodiment, two authentication signatures may be calculated. A first authentication signature may be generated for the file header. A second authentication signature may be generated for the file contents. When the file is accessed at a recipient computer, two corresponding hashes may be calculated. In particular, a first hash may be calculated for the file header and compared to the first authentication signature. A mismatch between the first hash and the first authentication signature can indicate that the file header or metadata has been tampered with. A second hash may be calculated for the file contents and compared to the second authentication signature. A mismatch between the second hash and the second authentication signature can indicate that the file contents have been tampered with.

Figure 7:
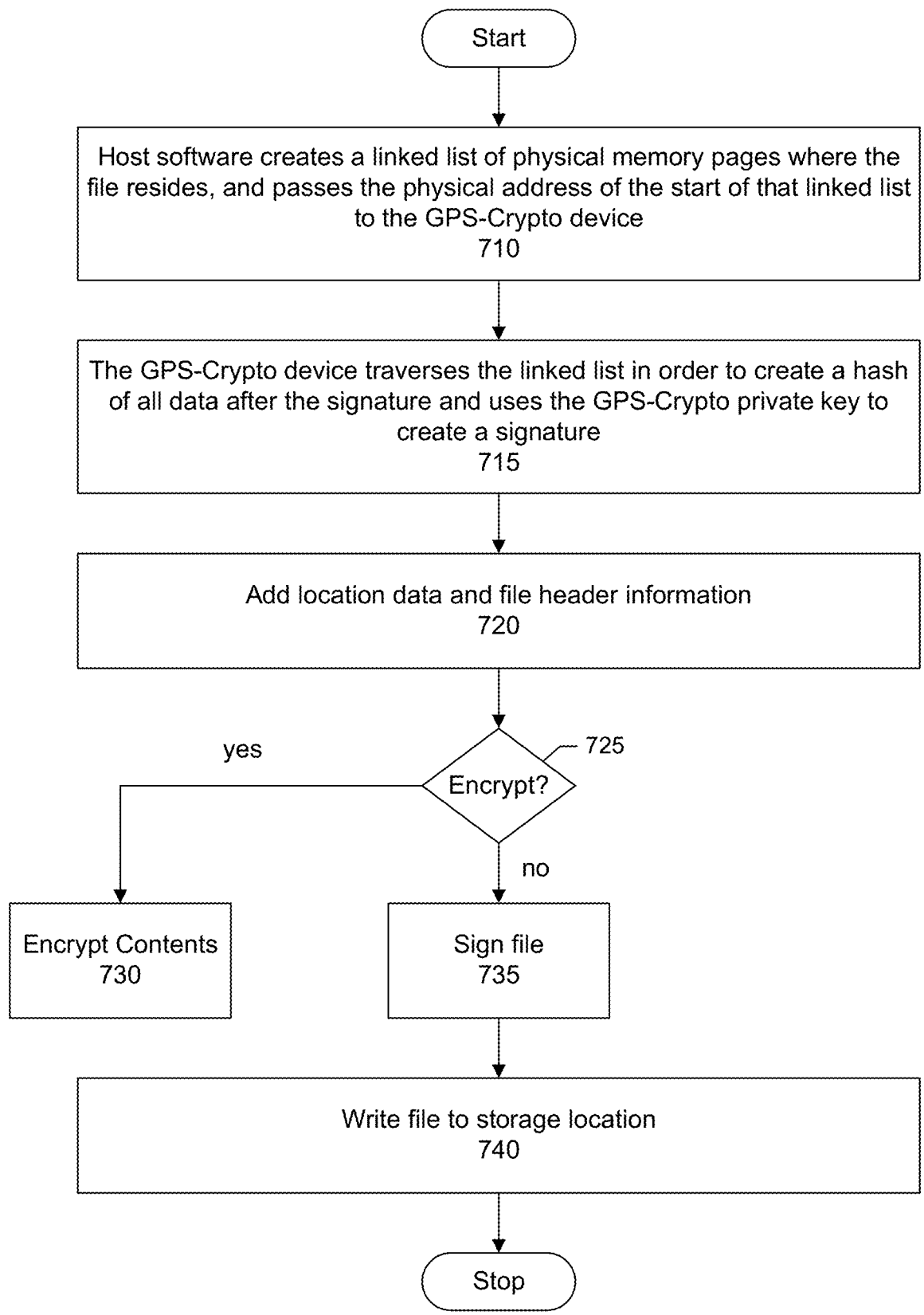
FIG. 7 shows a flow of a process to sign, or encrypt and sign a file, according to one or more embodiments.

FIG. 7 shows further detail of a process to sign or encrypt and sign a GPS-Crypto file. In a step 710 (FIG. 7), host software (e.g., host operating system) creates a linked list of physical memory pages where the file resides, and passes the physical address of the start of that linked list to the GPS-Crypto device.

In a step 715, the GPS-Crypto device traverses the linked list in order to create a hash of all data after the signature. The GPS-Crypto device uses its private key to create a signature.

In a step 720, location data and file header information is added (e.g., time and location stamp).

In a step 725, a determination is made as to whether the file is to be encrypted. As discussed, the GPS-Crypto device provides flexibility where exported files, though not encrypted, can have time and location stamp authentication and be accessible by hosts that may not have a GPS-Crypto device. The GPS-Crypto device also provides for tight security by encrypting files so that they files can only be accessed by hosts having a GPS-Crypto device and only under certain contexts or conditions.

If a determination is to encrypt the file, the file is encrypted (step 730) and then signed (step 735). In a specific embodiment, if the user selects other security attributes, besides time and location stamp authentication, such as geo-fencing, time-fencing, exclusion zone, expiration date, or other security context, or combinations of these, the file is automatically encrypted by default.

Alternatively, if a determination is to not encrypt, the encryption step is skipped and the file is signed (step 735) without the file having been encrypted.

In a step 740, the file is written to a storage location. For example, the file may be written to a local hard drive of the host, written to a remote cloud storage location accessible by the host, written to a network attached storage device of the host, or combinations of these.

Figure 8:
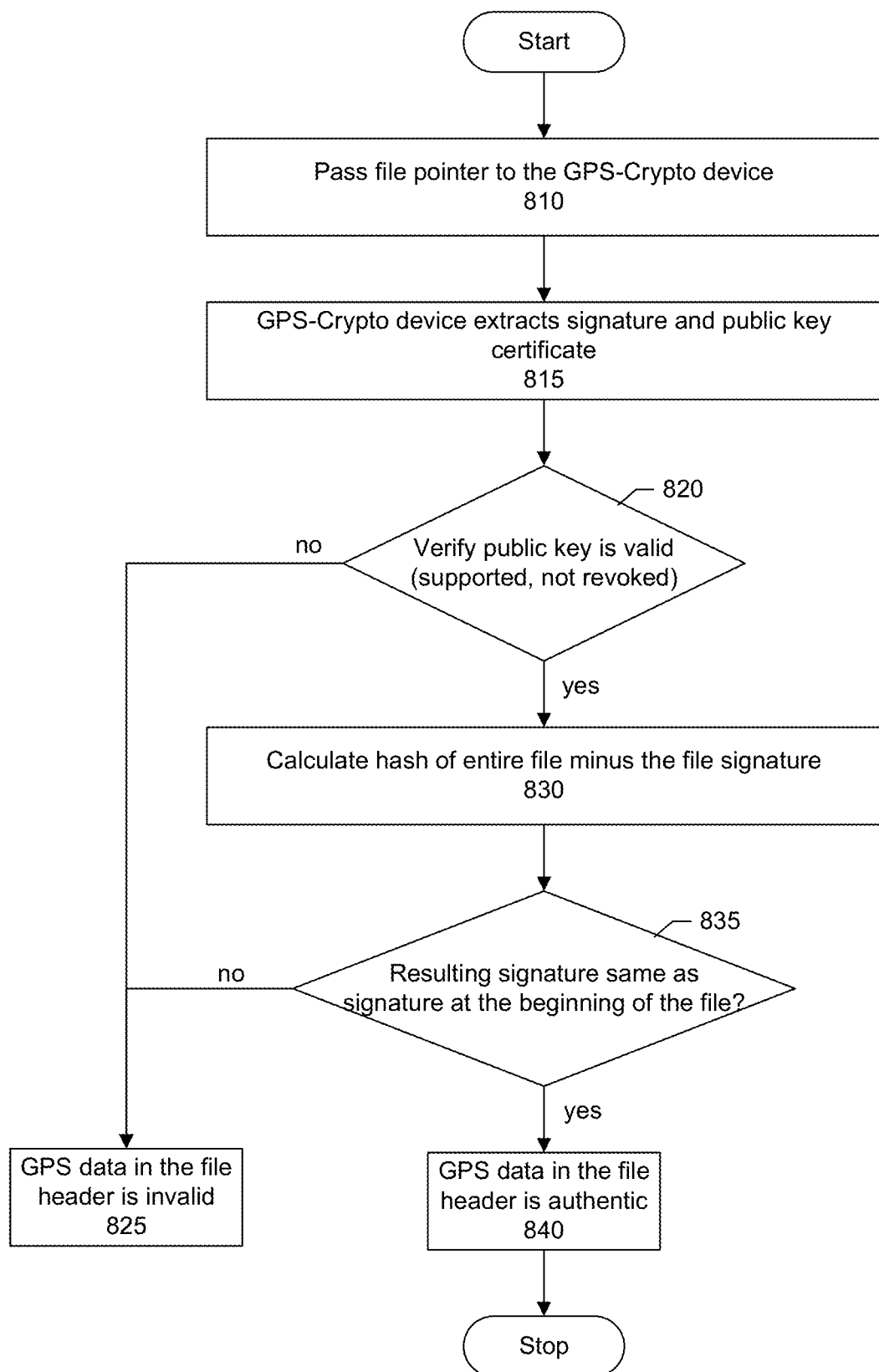
FIG. 8 shows a flow of a process to authenticate a file, according to one or more embodiments.

FIG. 8 shows a flow of a process to authenticate a GPS-Crypto file. In brief, a flow of a process to authenticate a GPS-Crypto file may include:

Step 1) Calculate hash of entire file past the file signature

Step 2) Generate authentication signature by passing hash and GPS-Crypto public key to crypto software or hardware.

Step 3) Compare the resulting signature to the signature at the beginning of the file.

Step 4) If the two signatures match, the GPS data in the file header reflects the creation time and place of the file.

More particularly, in a specific embodiment, in a step 810 (FIG. 8), a file pointer is passed to the GPS-Crypto device or chip. In a step 815, the GPS-Crypto device extracts the signature and public key certificate from the file.

In a step 820, a verification is performed to ensure that the public key is still valid (e.g., supported and not revoked). The verification may include checking an expiration date of the public key, checking a certificate revocation list (CRL) provided by the issuing certificate authority (CA), or both.

If the verification of the public key fails, a determination is made that the GPS data in the file is or may be invalid (step 825). For example, a dialog box may be displayed on an electronic screen of the host. The dialog box may include a message indicating to the user that the GPS data in the file could not be verified.

If the public key is verified as valid, a hash is calculated of the entire file with the exception of the file signature (step 830).

In a step 835, the resulting signature is compared against the authentication signature stored at the beginning of the file to determine whether the two signatures match or are the same.

If the two signatures match, a determination is made that the GPS data in the file header is authentic (step 840). In other words, if a timestamp in the file header indicates that the file was created at a particular date and time, the user can be assured that the file was in fact created at that particular date and time. Similarly, if a location stamp in the file header indicates that the file was created at a particular location, the user can be assured that the file was in fact created at that particular location.

Alternatively, if the two signatures do not match, a determination is made that the GPS data in the file is invalid (step 825). In other words, a timestamp in the file header indicating that the file was created at a particular date and time may not in fact be the true date and time that the file was created. Similarly, a location stamp in the file header indicating that the file was created at a particular location may not in fact be the true location at which the file was created.

Figure 9:
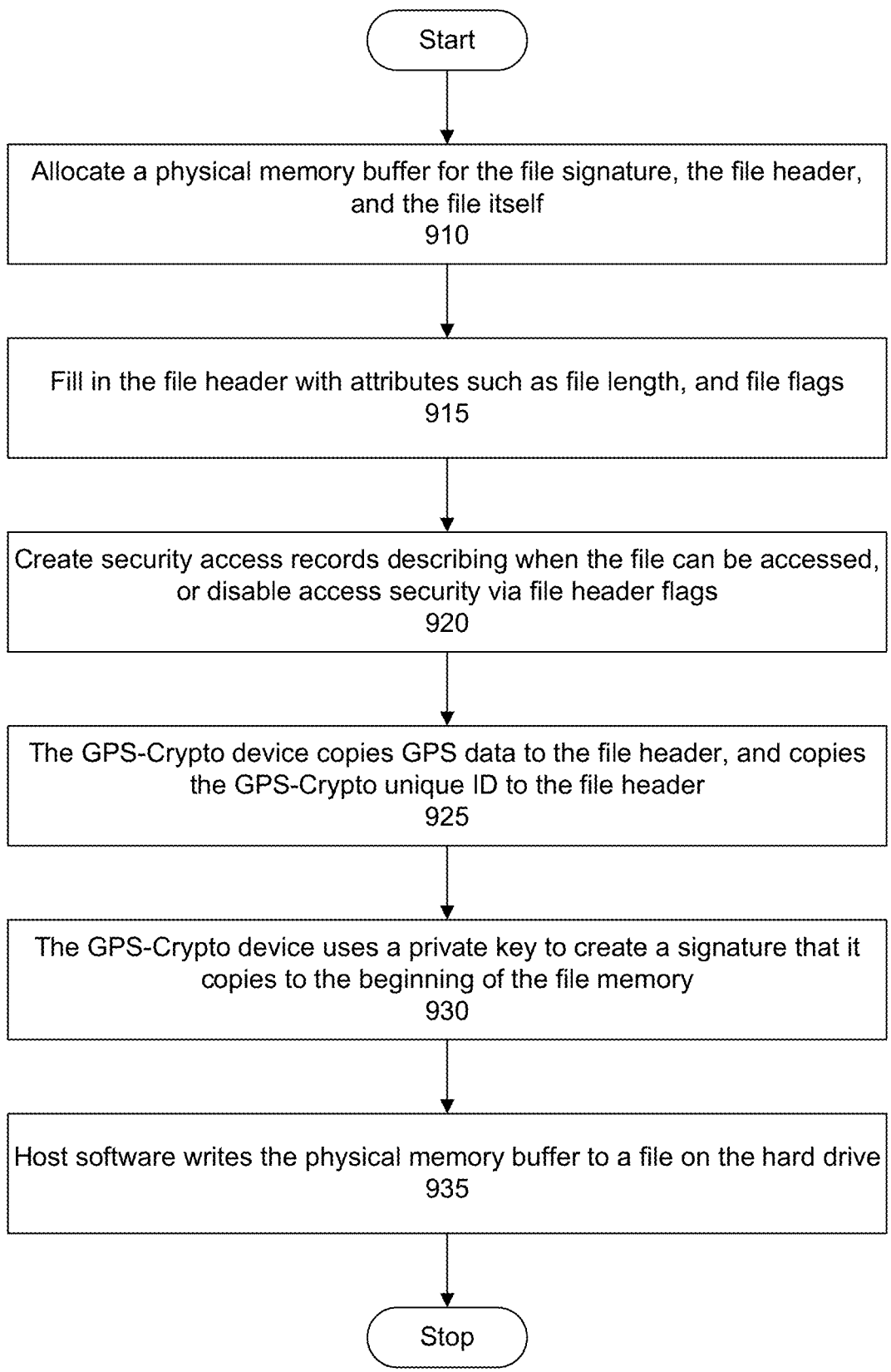
FIG. 9 shows a flow of a process to timestamp and location stamp a file, according to one or more embodiments.

FIG. 9 shows a flow of a process to timestamp and location stamp a file. In a step 910, a physical memory buffer for the file signature, the file header, and the file itself is allocated. In a step 915, the file header is filled or populated with attributes such as file length, and file flags. In a step 920, security access records are created describing when the file can be accessed. Alternatively, access security may be disabled via file header flags.

A linked list is created for all physical memory pages of the file and the start address is passed to the GPS-Crypto device.

In a step 925, the GPS-Crypto device copies GPS data to the file header, and copies the GPS-Crypto unique ID to the file header.

In a step 930, the GPS-Crypto device uses a private key to create a signature that it copies to the beginning of the file memory.

In a step 935, host software (e.g., host operating system) writes the physical memory buffer to a file on the hard drive.

Figure 10:
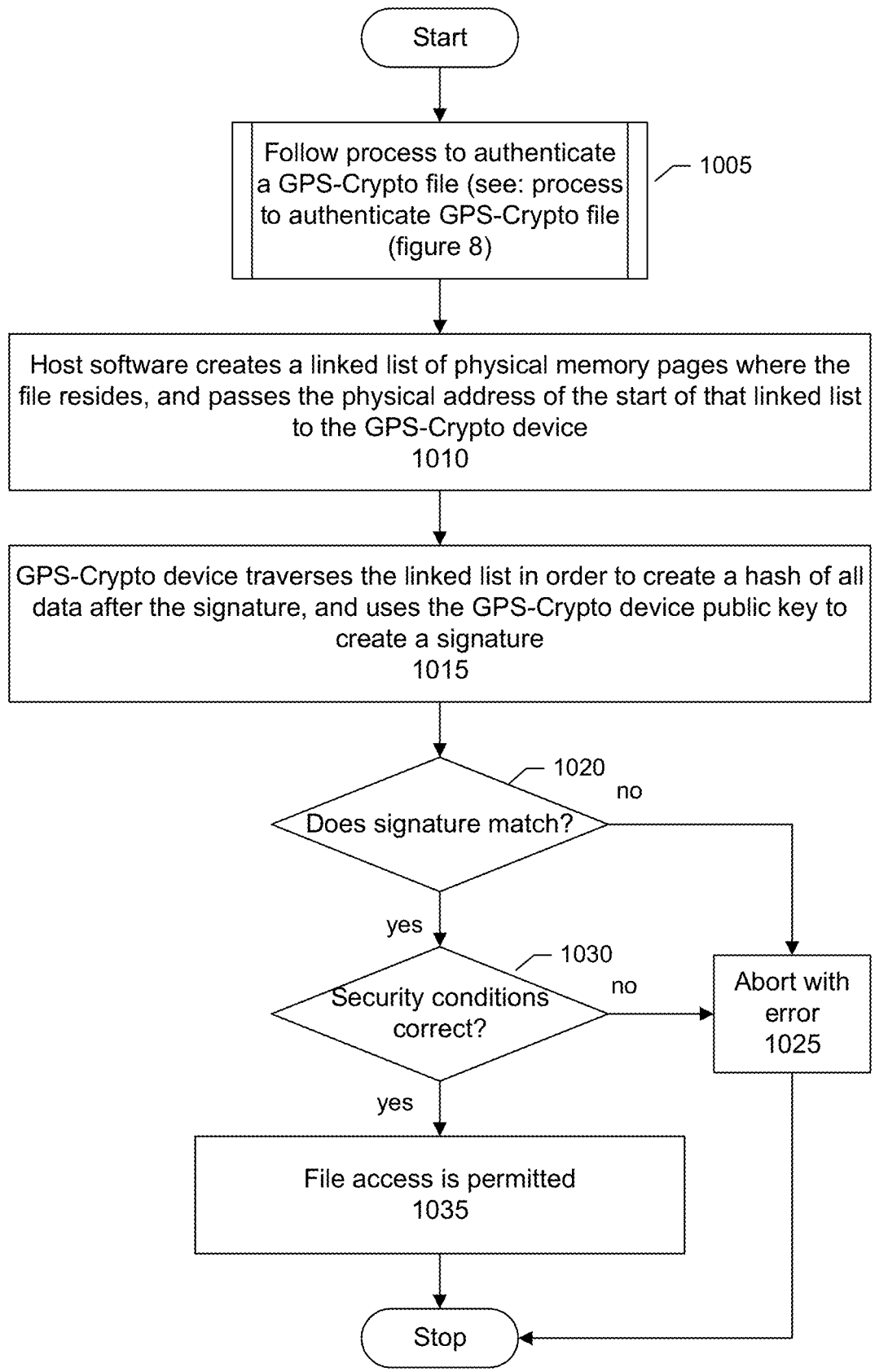
FIG. 10 shows a flow of a process to decrypt an encrypted file, according to one or more embodiments.

FIG. 10 shows a flow of a process to decrypt an encrypted GPS-Crypto file. An input 1005 to the process is a file having been authenticated by the GPS-Crypto device (see, e.g., FIG. 8). In a step 1010, the host software (e.g., host operating system) creates a linked list of physical memory pages where the file resides, and passes the physical address of the start of that linked list to the GPS-Crypto device.

In a step 1015, the GPS-Crypto device traverses that linked list in order to create a hash of all data after the signature. The GPS-Crypto device uses the public key to create a signature. In particular, input to the hash includes the file header and file content regions, but does not include the authentication signature at the beginning of the file. In an embodiment, the file may be chunked, such as divided into smaller 4 KB pieces, in order to accommodate memory limitations, and then hashed one chunk at a time.

In a step 1020, the GPS-Crypto devices determines whether the hash (e.g., signature) matches the authentication signature at the beginning of the file. If there is not a match, the process aborts with an error (step 1025). The file, including the file content, remains in its encrypted format and thus inaccessible.

Alternatively, if there is a match, a check is performed for each security condition specified in the file header (step 1030). More particularly, the GPS-Crypto engine parses the header flags to determine which file security is enabled. If a particular type of security is not enabled, that security condition is considered met (e.g., if time-fencing is disabled, or there are no time-fencing security records in the file header, the file can be accessed without regard to the current time. If each security condition specified in the file header is satisfied, the GPS-Crypto device allows file access by decrypting the file (step 1035).

Alternatively, if any security condition specified in the file header is not satisfied, the process aborts with an error and the file remains in its encrypted format and thus inaccessible (step 1025).

Figure 11:
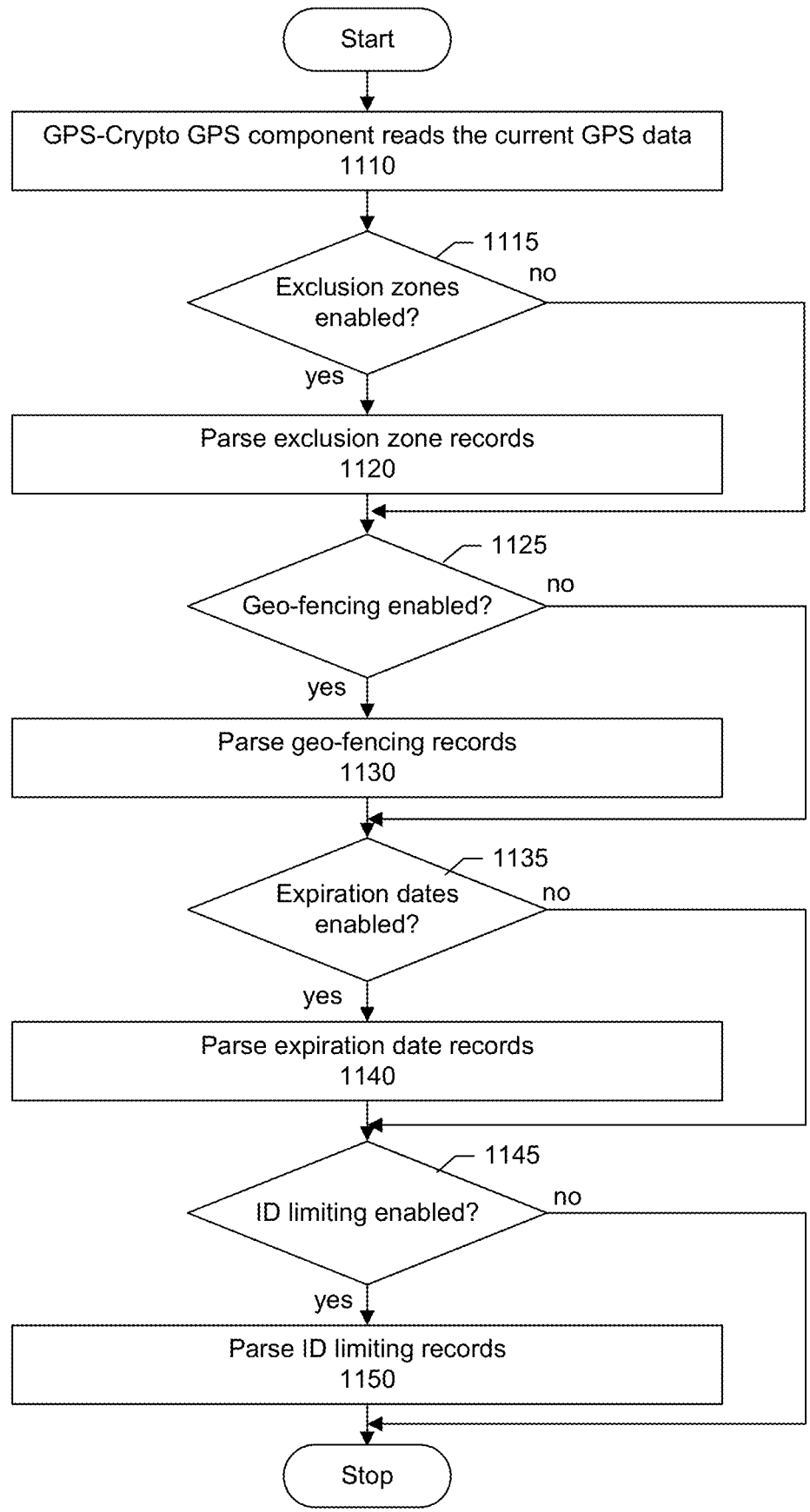
FIG. 11 shows a flow of a process to parse file header security access records, according to one or more embodiments.

FIG. 11 shows a flow of a process to parse the file header security access records in further detail. Security access records in the file header associated with a disabled header flag are ignored. For example, if geo-fencing is disabled, the file can be accessed without regard to at least location.

More particularly, in a step 1110, the GPS-Crypto GPS component reads the current GPS data. For example, the GPS-Crypto component may determine a current geographical location, time, or both at which file access is being attempted.

In a step 1115, a determination is made as to whether the exclusion zone flag setting in header of the file is disabled or enabled. If exclusion zones are enabled in the file header flags, the GPS component of the GPS-Crypto device parses all exclusion zone security access records, looking for any regions overlapping the current location at which access to the file is being attempted (step 1120). If found, the process aborts with an error and the file remains in an encrypted format.

Alternatively, if exclusion zones are disabled or the exclusion zones do not overlap with the current location at which access to the file is being attempted, the process advances to a step 1125.

In step 1125, a determination is made as to whether the geo-fencing flag setting in the header of the file is disabled or enabled. If geo-fencing is enabled in the file header flags, the GPS component of the GPS-Crypto device parses all geo-fencing records, looking for any region that includes the current location at which access to the file is being attempted (step 1130). If none is found, the process aborts with an error and the file remains in the encrypted format.

Alternatively, if geo-fencing is disabled or the geo-fence includes the current location at which access to the file is being attempted, the process advances to a step 1135.

In step 1135, a determination is made as to whether expiration dates flag setting in the header of the file is disabled or enabled. If expiration dates are enabled in the file header flags, the expiration date records are examined to determine if the current date and time is after the expiration date and time (step 1140). If so, the process aborts with an error and the file remains in the encrypted format. In a specific embodiment, the expiration date record also includes a timezone, day of week, hour of day access map. If the current time does not align with the access map, the process aborts with an error and the file remains in the encrypted format.

Alternatively, if expiration dates setting flag is disabled or the current time is before the specified expiration date in the file header, the process advances to a step 1145.

In step 1145, a determination is made as to whether the GPS-Crypto ID limiting flag is disabled or enabled. If GPS-Crypto ID limiting is enabled in the file header, the ID limiting records in the file header are parsed (step 1150) to confirm that the current ID (e.g., GPS-Crypto ID of device attempting file access) can be found in the GPS-Crypto ID list record. If the ID cannot be found in the list of GPS-Crypto IDs authorized to access the file, the process aborts with an error and the file remains in the encrypted format.

Time-fencing security access records, if enabled, may be similarly parsed.

Below are some benefits of the GPS-Crypto device according to one or more embodiments.

1) Allows a file timestamp to be authenticated via a public key.

2) Allows a file location creation to be authenticated via a public key.

3) Allows decryption to be limited to certain dates, times, days of week, locations, certain GPS-Crypto unique ID, list of unique IDs, or security group.

4) Allows a file to only be accessed on the system that it was created on.

5) Allows the file to support expiration dates where they become inaccessible even with proper credentials.

6) While powered, the GPS-Crypto device watches for signs of GPS data spoofing. If any of these are detected, the GPS-Crypto device will be temporarily disabled. Signs of GPS spoofing may include: a) Time going backwards; b) Location data changing too rapidly; c) Non-Primary GPS sources disappearing; 7) GPS-Crypto device detects noise consistent with GPS spoofing; 8) GPS-Crypto device transmits random frequency radio signal and measures the return time/amplitude to detect Faraday Cage GPS Spoofing.

In a specific embodiment, a method includes creating a security access record specifying a geo-fence that defines a geographical boundary within which access to a file is allowed; copying the security access record to a header region of a memory buffer; encrypting contents of the file; signing the file; writing the memory buffer to a new file, the new file being a signed and encrypted version of the file; detecting at another host (e.g., second host) having another authentication device (e.g., second authentication device), spoofing of a global positioning system (GPS) signal during an attempt by the second host to access the signed and encrypted version of the file; and upon detecting the spoofing, blocking the attempt by the other host to access the encrypted and signed version of the file. Detecting the spoofing may include determining that a backwards shift in time has occurred.

Detecting the spoofing may include identifying a reported current geographical position of the second host and a corresponding current time; identifying a previous geographical position of the second host and a corresponding previous time; and determining that the reported current geographical position of the second host is invalid when a speed of travel is greater than a threshold speed of travel, the speed of travel being calculated as a distance between the reported current geographical position and the previous geographical position divided by an elapsed amount of time between the current time and the previous time.

Figure 12:
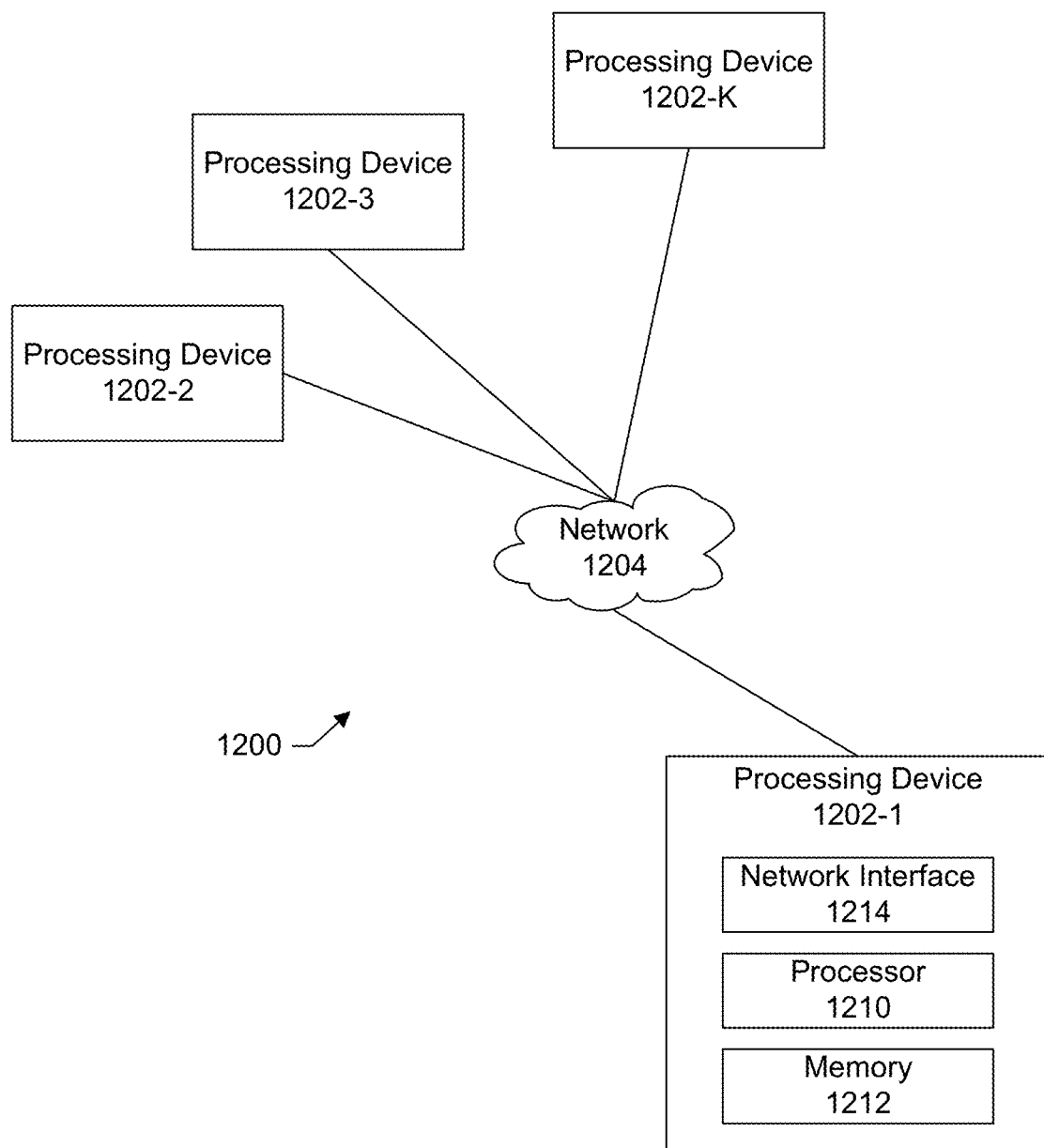
FIG. 12 shows a block diagram of a processing platform that may be utilized to implement at least a portion of an information processing system, according to one or more embodiments.

FIG. 12 shows an example of a processing platform 1200. The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA) or other type of processing circuitry, as well as portions or combinations of such circuitry elements.

The memory 1212 may comprise random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

Figure 13:
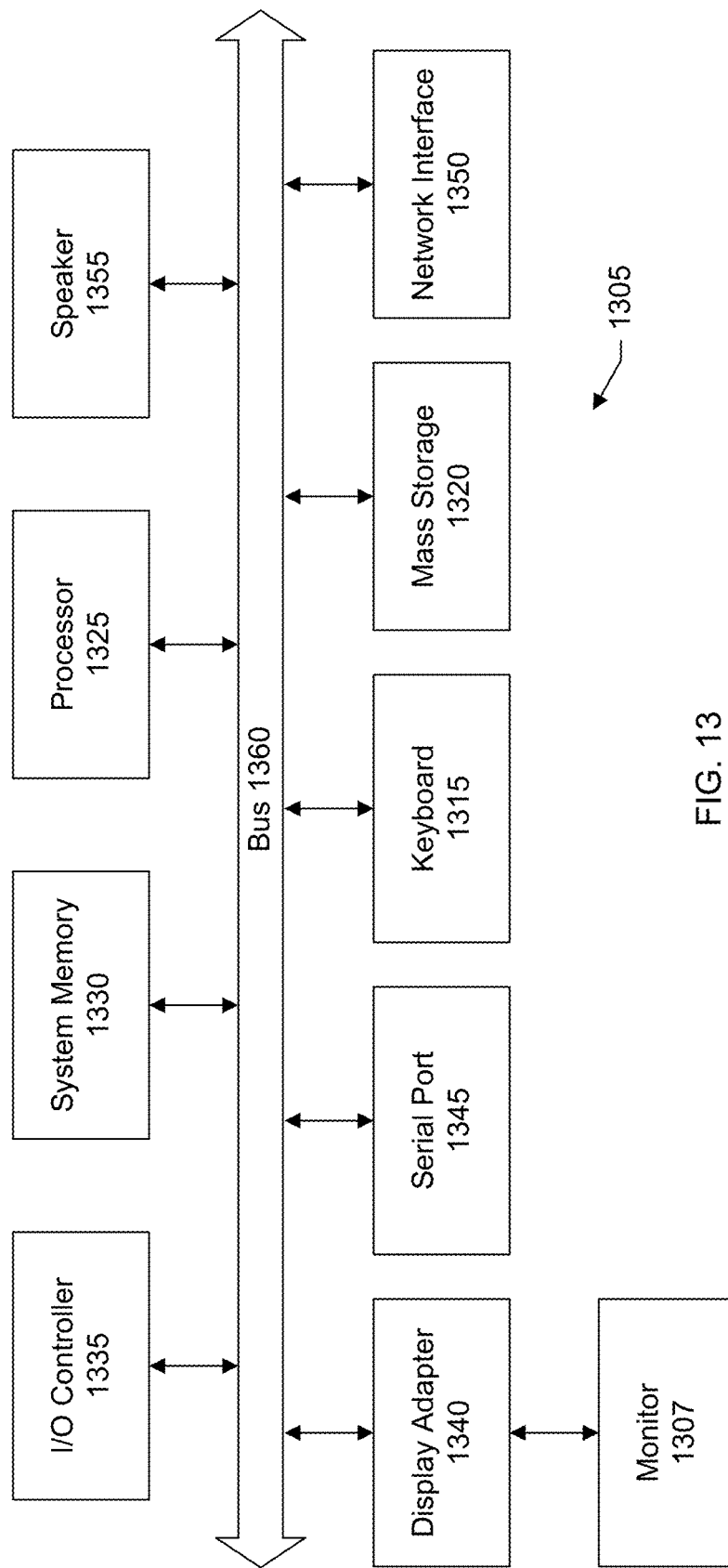
FIG. 13 shows a block diagram of a computer system suitable for use with the information processing system, according to one or more embodiments.

FIG. 13 shows a system block diagram of a computer system 1305 used to execute the software of the present system described herein. The computer system includes a monitor 1307, keyboard 1315, and mass storage devices 1320. Computer system 1305 further includes subsystems such as central processor 1325, system memory 1330, input/output (I/O) controller 1335, display adapter 1340, serial or universal serial bus (USB) port 1345, network interface 1350, and speaker 1355. The system may also be used with computer systems with additional or fewer subsystems. For example, a computer system could include more than one processor 1325 (i.e., a multiprocessor system) or a system may include a cache memory.

Arrows such as 1360 represent the system bus architecture of computer system 1305. However, these arrows are illustrative of any interconnection scheme serving to link the subsystems. For example, speaker 1355 could be connected to the other subsystems through a port or have an internal direct connection to central processor 1325. The processor may include multiple processors or a multicore processor, which may permit parallel processing of information. Computer system 1305 shown in FIG. 13 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows® family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, there is an apparatus preventing digital forgery comprising: an authentication module receiving an indication to export a file from a host; the authentication module allocating a memory buffer for a signature region, a header region, and a content region; the authentication module calculating a location stamp and a timestamp for content of the file; the authentication module copying the location stamp and the timestamp to the header region; the authentication module generating, using a private key associated with the authentication module, an authentication signature based on the header and content regions, the header region including the copied location stamp and the timestamp, and the content region including the content of the file; the authentication module copying the authentication signature to the signature region; and the authentication module writing the memory buffer to a new file, the new file being a signed version of the file and comprising the signature region having the authentication signature, the header region having the location stamp and the timestamp, and the content region having the content of the file.

In a specific embodiment, the location stamp and the timestamp in the header region of the signed file are authenticated by: generating, using a public key corresponding to the private key, a new signature based on the header and content regions of the signed file; comparing the new signature to the authentication signature in the signature region of signed file; if the new signature matches the authentication signature, determining that the location stamp and the timestamp in the header region of the signed file are authentic; and if the new signature does not match the authentication signature, determining that at least one of the location stamp or the timestamp in the header region of the signed file are invalid. In a specific embodiment, the location stamp and the timestamp may be authenticated at another host that does not have an authentication module. In other words, so long as the other host has the capability to handle public keys, the other host can verify that the header has not been tampered with, despite the other host not having an authentication module.

The apparatus may include: after receiving the indication to export the file, the authentication module creating a plurality security access records; the authentication module copying the plurality of security access records to the header region, wherein the plurality of security access records when enabled specify a plurality of conditions to satisfy before access to the signed version of the file is allowed, wherein a first condition is satisfied when access to the signed version of the file is attempted outside an exclusion zone as defined in a first security access record, a second condition is satisfied when access to the signed version of the file is attempted within a geo-fence as defined in a second security access record, a third security condition is satisfied when access to the signed version of the file is attempted before an expiration date as defined in a third security access record, a fourth security condition is satisfied when access to the signed version of the file is attempted by another host having another authentication module with a device identifier (ID) defined in a fourth security access record, and a fifth security condition is satisfied when access to the signed version of the file is attempted within a time-fence as defined in a fifth security access record; and the authentication module encrypting the file to prevent access to the file unless each condition of each enabled security access record is satisfied.

The apparatus may include the authentication module creating a security access record specifying a geo-fence that defines a geographical boundary within which access to the file is allowed; the authentication module copying the security access record to the header region; before writing the memory buffer to the new file, the authentication module encrypting the file so that the new and signed version of the file is encrypted; another authentication module at another host detecting spoofing of a global positioning system (GPS) signal during an attempt by the other host to access the encrypted and signed version of the file; and upon detecting the spoofing, the other authentication module blocking the attempt by the other host to access the encrypted and signed version of the file.

The apparatus may include before generating the authentication signature, the authentication module creating a security access record specifying an expiration date after which access to the file is not allowed; the authentication module copying the security access record to the header region; and the authentication module encrypting the content region and the header region having the location stamp, timestamp, and the security access record, wherein the authentication signature is generated after the security access record has been copied to the header region.

The apparatus may include before generating the authentication signature, the authentication module creating a security access record specifying a geo-fence that defines a geographical boundary within which access to the file is allowed; the authentication module copying the security access record to the header region; and the authentication module encrypting the content region and the header region having the location stamp, timestamp, and the security access record, wherein the authentication signature is generated after the security access record has been copied to the header region. The signed version of the file may be maintained in an unencrypted format.

In a specific embodiment, there is a system for preventing digital forgery, the system comprising: a processor; and memory configured to store one or more sequences of instructions which, when executed by the processor, cause the processor to carry out the steps of: receiving an indication to export a file from a host having an authentication device; allocating a memory buffer for a signature region, a header region, and a content region; calculating a location stamp and a timestamp for content of the file; copying the location stamp and the timestamp to the header region; generating, using a private key associated with the authentication device, an authentication signature based on the header and content regions, the header region including the copied location stamp and the timestamp, and the content region including the content of the file; copying the authentication signature to the signature region; and writing the memory buffer to a new file, the new file being a signed version of the file and comprising the signature region having the authentication signature, the header region having the location stamp and the timestamp, and the content region having the content of the file.

In an embodiment, the location stamp and the timestamp in the header region of the signed file are authenticated by: generating, using a public key corresponding to the private key, a new signature based on the header and content regions of the signed file; comparing the new signature to the authentication signature in the signature region of signed file; if the new signature matches the authentication signature, determining that the location stamp and the timestamp in the header region of the signed file are authentic; and if the new signature does not match the authentication signature, determining that at least one of the location stamp or the timestamp in the header region of the signed file are invalid.

In an embodiment, the processor carries out the steps of: after receiving the indication to export the file, creating a plurality security access records; copying the plurality of security access records to the header region, wherein the plurality of security access records when enabled specify a plurality of conditions to satisfy before access to the signed version of the file is allowed, wherein a first condition is satisfied when access to the signed version of the file is attempted outside an exclusion zone as defined in a first security access record, a second condition is satisfied when access to the signed version of the file is attempted within a geo-fence as defined in a second security access record, a third security condition is satisfied when access to the signed version of the file is attempted before an expiration date as defined in a third security access record, a fourth security condition is satisfied when access to the signed version of the file is attempted by another host having another authentication device with a device identifier (ID) defined in a fourth security access record, and a fifth security condition is satisfied when access to the signed version of the file is attempted within a time-fence as defined in a fifth security access record; and encrypting the file to prevent access to the file unless each condition of each enabled security access record is satisfied.

In an embodiment, the processor carries out the steps of: creating a security access record specifying a geo-fence that defines a geographical boundary within which access to the file is allowed; copying the security access record to the header region; before writing the memory buffer to the new file, encrypting the file so that the new and signed version of the file is encrypted; detecting, at another host having another authentication device, spoofing of a global positioning system (GPS) signal during an attempt by the other host to access the encrypted and signed version of the file; and upon detecting the spoofing, blocking the attempt by the other host to access the encrypted and signed version of the file.

In an embodiment, the processor carries out the steps of: before generating the authentication signature, creating a security access record specifying an expiration date after which access to the file is not allowed; copying the security access record to the header region; and encrypting the content region and the header region having the location stamp, timestamp, and the security access record, wherein the authentication signature is generated after the security access record has been copied to the header region.

In an embodiment, the processor carries out the steps of: before generating the authentication signature, creating a security access record specifying a geo-fence that defines a geographical boundary within which access to the file is allowed; copying the security access record to the header region; and encrypting the content region and the header region having the location stamp, timestamp, and the security access record, wherein the authentication signature is generated after the security access record has been copied to the header region.

In an embodiment, the signed version of the file is maintained in an unencrypted format.

In another specific embodiment, there is a method comprising: receiving an indication to export a file from a host having an authentication device; allocating a memory buffer for a signature region, a header region, and a content region; calculating a location stamp and a timestamp for content of the file; copying the location stamp and the timestamp to the header region; generating, using a private key associated with the authentication device, an authentication signature based on the header and content regions, the header region including the copied location stamp and the timestamp, and the content region including the content of the file; copying the authentication signature to the signature region; and writing the memory buffer to a new file, the new file being a signed version of the file and comprising the signature region having the authentication signature, the header region having the location stamp and the timestamp, and the content region having the content of the file.

The method may include before generating the authentication signature, creating a security access record specifying an exclusion zone that defines a geographical boundary within which access to the file is not allowed; copying the security access record to the header region; and encrypting the content region and the header region having the location stamp, timestamp, and the security access record, wherein the authentication signature is generated after the security access record has been copied to the header region.

The method may include before generating the authentication signature, creating a security access record specifying a time-fence that defines times and dates during which access to the file is allowed; copying the security access record to the header region; and encrypting the content region and the header region having the location stamp, timestamp, and the security access record, wherein the authentication signature is generated after the security access record has been copied to the header region.

In another specific embodiment, there is a computer program product, comprising a non-transitory computer-readable medium having a computer-readable program code embodied therein, the computer-readable program code adapted to be executed by one or more processors to implement a method comprising: receiving an indication to export a file from a host having an authentication device;

allocating a memory buffer for a signature region, a header region, and a content region; calculating a location stamp and a timestamp for content of the file; copying the location stamp and the timestamp to the header region; generating, using a private key associated with the authentication device, an authentication signature based on the header and content regions, the header region including the copied location stamp and the timestamp, and the content region including the content of the file; copying the authentication signature to the signature region; and writing the memory buffer to a new file, the new file being a signed version of the file and comprising the signature region having the authentication signature, the header region having the location stamp and the timestamp, and the content region having the content of the file.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above. Elements recited in the claims may be performed by microprocessor elements, processing components, hardware circuitry, software program steps, method steps, or any combination thereof.

What is claimed is:

1. An apparatus preventing digital forgery comprising:
an authentication module receiving an indication to export a file from a host;
the authentication module allocating a memory buffer for a signature region, a header region, and a content region;
the authentication module calculating a location stamp and a timestamp for content of the file;
the authentication module copying the location stamp and the timestamp to the header region;
the authentication module generating, using a private key associated with the authentication module, an authentication signature based on the header and content regions, the header region including the copied location stamp and the timestamp, and the content region including the content of the file;
the authentication module copying the authentication signature to the signature region; and
the authentication module writing the memory buffer to a new file, the new file being a signed version of the file and comprising the signature region having the authentication signature, the header region having the location stamp and the timestamp, and the content region having the content of the file.

2. The apparatus of claim 1 wherein the location stamp and the timestamp in the header region of the signed file are authenticated by:
generating, using a public key corresponding to the private key, a new signature based on the header and content regions of the signed file;
comparing the new signature to the authentication signature in the signature region of signed file;
if the new signature matches the authentication signature, determining that the location stamp and the timestamp in the header region of the signed file are authentic; and
if the new signature does not match the authentication signature, determining that at least one of the location stamp or the timestamp in the header region of the signed file are invalid.

3. The apparatus of claim 1 comprising:
after receiving the indication to export the file, the authentication module creating a plurality security access records;
the authentication module copying the plurality of security access records to the header region, wherein the plurality of security access records when enabled specify a plurality of conditions to satisfy before access to the signed version of the file is allowed, wherein a first condition is satisfied when access to the signed version of the file is attempted outside an exclusion zone as defined in a first security access record,
a second condition is satisfied when access to the signed version of the file is attempted within a geo-fence as defined in a second security access record,
a third security condition is satisfied when access to the signed version of the file is attempted before an expiration date as defined in a third security access record,
a fourth security condition is satisfied when access to the signed version of the file is attempted by another host having another authentication module with a device identifier (ID) defined in a fourth security access record, and
a fifth security condition is satisfied when access to the signed version of the file is attempted within a time-fence as defined in a fifth security access record; and
the authentication module encrypting the file to prevent access to the file unless each condition of each enabled security access record is satisfied.

4. The apparatus of claim 1 comprising:
the authentication module creating a security access record specifying a geo-fence that defines a geographical boundary within which access to the file is allowed;
the authentication module copying the security access record to the header region;
before writing the memory buffer to the new file, the authentication module encrypting the file so that the new and signed version of the file is encrypted;
another authentication module at another host detecting spoofing of a global positioning system (GPS) signal during an attempt by the other host to access the encrypted and signed version of the file; and
upon detecting the spoofing, the other authentication module blocking the attempt by the other host to access the encrypted and signed version of the file.

5. The apparatus of claim 1 comprising:
before generating the authentication signature, the authentication module creating a security access record specifying an expiration date after which access to the file is not allowed;
the authentication module copying the security access record to the header region; and
the authentication module encrypting the content region and the header region having the location stamp, timestamp, and the security access record, wherein the authentication signature is generated after the security access record has been copied to the header region.

6. The apparatus of claim 1 comprising:
before generating the authentication signature, the authentication module creating a security access record specifying a geo-fence that defines a geographical boundary within which access to the file is allowed;
the authentication module copying the security access record to the header region; and
the authentication module encrypting the content region and the header region having the location stamp, timestamp, and the security access record, wherein the authentication signature is generated after the security access record has been copied to the header region.

7. The apparatus of claim 1 wherein the signed version of the file is maintained in an unencrypted format.

8. A method comprising:
receiving an indication to export a file from a host having an authentication device;
allocating a memory buffer for a signature region, a header region, and a content region;
calculating a location stamp and a timestamp for content of the file;
copying the location stamp and the timestamp to the header region;
generating, using a private key associated with the authentication device, an authentication signature based on the header and content regions, the header region including the copied location stamp and the timestamp, and the content region including the content of the file;
copying the authentication signature to the signature region; and
writing the memory buffer to a new file, the new file being a signed version of the file and comprising the signature region having the authentication signature, the header region having the location stamp and the timestamp, and the content region having the content of the file.

9. The method of claim 8 wherein the location stamp and the timestamp in the header region of the signed file are authenticated by:
generating, using a public key corresponding to the private key, a new signature based on the header and content regions of the signed file;
comparing the new signature to the authentication signature in the signature region of signed file;
if the new signature matches the authentication signature, determining that the location stamp and the timestamp in the header region of the signed file are authentic; and
if the new signature does not match the authentication signature, determining that at least one of the location stamp or the timestamp in the header region of the signed file are invalid.

10. The method of claim 8 comprising:
after receiving the indication to export the file, creating a plurality security access records;
copying the plurality of security access records to the header region, wherein the plurality of security access records when enabled specify a plurality of conditions to satisfy before access to the signed version of the file is allowed, wherein a first condition is satisfied when access to the signed version of the file is attempted outside an exclusion zone as defined in a first security access record,
a second condition is satisfied when access to the signed version of the file is attempted within a geo-fence as defined in a second security access record,
a third security condition is satisfied when access to the signed version of the file is attempted before an expiration date as defined in a third security access record,
a fourth security condition is satisfied when access to the signed version of the file is attempted by another host having another authentication device with a device identifier (ID) defined in a fourth security access record, and
a fifth security condition is satisfied when access to the signed version of the file is attempted within a time-fence as defined in a fifth security access record; and
encrypting the file to prevent access to the file unless each condition of each enabled security access record is satisfied.

11. The method of claim 8 comprising:
creating a security access record specifying a geo-fence that defines a geographical boundary within which access to the file is allowed;
copying the security access record to the header region;
before writing the memory buffer to the new file, encrypting the file so that the new and signed version of the file is encrypted;
detecting, at another host having another authentication device, spoofing of a global positioning system (GPS) signal during an attempt by the other host to access the encrypted and signed version of the file; and
upon detecting the spoofing, blocking the attempt by the other host to access the encrypted and signed version of the file.

12. The method of claim 8 comprising:
before generating the authentication signature, creating a security access record specifying an expiration date after which access to the file is not allowed;
copying the security access record to the header region; and
encrypting the content region and the header region having the location stamp, timestamp, and the security access record, wherein the authentication signature is generated after the security access record has been copied to the header region.

13. The method of claim 8 comprising:
before generating the authentication signature, creating a security access record specifying a geo-fence that defines a geographical boundary within which access to the file is allowed;
copying the security access record to the header region; and
encrypting the content region and the header region having the location stamp, timestamp, and the security access record, wherein the authentication signature is generated after the security access record has been copied to the header region.

14. The method claim 8 wherein the signed version of the file is maintained in an unencrypted format.

15. A computer program product, comprising a non-transitory computer-readable medium having a computer-readable program code embodied therein, the computer-readable program code adapted to be executed by one or more processors to implement a method comprising:
receiving an indication to export a file from a host having an authentication device;

allocating a memory buffer for a signature region, a header region, and a content region;

calculating a location stamp and a timestamp for content of the file;

copying the location stamp and the timestamp to the header region;

generating, using a private key associated with the authentication device, an authentication signature based on the header and content regions, the header region including the copied location stamp and the timestamp, and the content region including the content of the file;

copying the authentication signature to the signature region; and writing the memory buffer to a new file, the new file being a signed version of the file and comprising the signature region having the authentication signature, the header region having the location stamp and the timestamp, and the content region having the content of the file.

16. The computer program product of claim 15 wherein the location stamp and the timestamp in the header region of the signed file are authenticated by:

generating, using a public key corresponding to the private key, a new signature based on the header and content regions of the signed file;

comparing the new signature to the authentication signature in the signature region of signed file;

if the new signature matches the authentication signature, determining that the location stamp and the timestamp in the header region of the signed file are authentic; and if the new signature does not match the authentication signature, determining that at least one of the location stamp or the timestamp in the header region of the signed file are invalid.

17. The computer program product of claim 15 wherein the method comprises:

after receiving the indication to export the file, creating a plurality security access records;

copying the plurality of security access records to the header region, wherein the plurality of security access records when enabled specify a plurality of conditions to satisfy before access to the signed version of the file is allowed, wherein a first condition is satisfied when access to the signed version of the file is attempted outside an exclusion zone as defined in a first security access record, a second condition is satisfied when access to the signed version of the file is attempted within a geo-fence as defined in a second security access record, a third security condition is satisfied when access to the signed version of the file is attempted before an expiration date as defined in a third security access record, a fourth security condition is satisfied when access to the signed version of the file is attempted by another host having another authentication device with a device identifier (ID) defined in a fourth security access record, and a fifth security condition is satisfied when access to the signed version of the file is attempted within a time-fence as defined in a fifth security access record; and encrypting the file to prevent access to the file unless each condition of each enabled security access record is satisfied.

18. The computer program product of claim 15 wherein the method comprises:

creating a security access record specifying a geo-fence that defines a geographical boundary within which access to the file is allowed;

copying the security access record to the header region;

before writing the memory buffer to the new file, encrypting the file so that the new and signed version of the file is encrypted;

detecting, at another host having another authentication device, spoofing of a global positioning system (GPS) signal during an attempt by the other host to access the encrypted and signed version of the file; and upon detecting the spoofing, blocking the attempt by the other host to access the encrypted and signed version of the file.

19. The computer program product of claim 15 wherein the method comprises:

before generating the authentication signature, creating a security access record specifying an expiration date after which access to the file is not allowed;

copying the security access record to the header region; and encrypting the content region and the header region having the location stamp, timestamp, and the security access record, wherein the authentication signature is generated after the security access record has been copied to the header region.

20. The computer program product of claim 15 wherein the method comprises:

before generating the authentication signature, creating a security access record specifying a geo-fence that defines a geographical boundary within which access to the file is allowed;

copying the security access record to the header region; and encrypting the content region and the header region having the location stamp, timestamp, and the security access record, wherein the authentication signature is generated after the security access record has been copied to the header region.

* * * * *